US012746630B2

(12) United States Patent

Soriano Asensio et al.

(10) Patent No.: US 12,746,630 B2

(45) Date of Patent: Sep. 29, 2026

(54) FLUID DISPENSING DEVICE WITH COUPLING TO POWER-DRIVEN TURNING TOOLS AND TURNING TOOL COMPRISING THE SAME

(71) Applicants: Antoni Josep Soriano Asensio, Lévis (CA); Maria Josefa Anillo Lopez, Lévis (CA)

(72) Inventors: Antoni Josep Soriano Asensio, Lévis (CA); Maria Josefa Anillo Lopez, Lévis (CA)

( * ) Notice: Subject to any disclaimer, the term of this patent is extended or adjusted under 35 U.S.C. 154(b) by 843 days.

(21) Appl. No.: 17/904,446

(22) PCT Filed: Feb. 18, 2021

(86) PCT No.: PCT/ES2021/070115

§ 371 (c)(1),
(2) Date: Aug. 17, 2022

(87) PCT Pub. No.: WO2021/165560

PCT Pub. Date: Aug. 26, 2021

(65) Prior Publication Data

US 2023/0081654 A1 Mar. 16, 2023

(30) Foreign Application Priority Data

Feb. 18, 2020 (ES) ............................... ES202030140

(51) Int. Cl.
*B23Q 11/10* (2006.01)
*B23B 45/00* (2006.01)
(Continued)

(52) U.S. Cl.
CPC ........ *B23Q 11/1092* (2013.01); *B23B 45/003* (2013.01); *B23Q 11/1076* (2013.01);
(Continued)

(58) Field of Classification Search
CPC ......... B24B 29/00; B24B 57/02; A47L 23/05; A47L 23/06; A47L 13/312; A47L 1/08;
(Continued)

(56) References Cited

U.S. PATENT DOCUMENTS 893,635 A * 7/1908 Marquart ........... A46B 11/0013 401/269
1,275,516 A * 8/1918 Wren ................ A46B 11/0027 401/175
(Continued)

*Primary Examiner* — Paul R Durand
*Assistant Examiner* — Randall A Gruby
(74) *Attorney, Agent, or Firm* — Gonzalo Lavin; Lavery, de Billy, L.L.P.

(57) ABSTRACT

The present invention refers to a device that is coupled to motorised tools whose consumable or implement rotates, preferably tools of the portable or swivelling type, supplying fluids either to the surface on which the consumable or implement acts, or to the consumable or implement itself so that it performs its function correctly, having a reservoir in which pressure is generated for its use and the device and the tool or consumable that is used being independent and interchangeable, and having conventional means of attachment that allow it to be used in conventional tools without having to adapt the tool, the consumable or implement.

5 Claims, 2 Drawing Sheets

(51) Int. Cl.

| | |
|---|---|
| ***B24B 23/02*** | (2006.01) |
| ***B24B 55/02*** | (2006.01) |
| ***B24B 57/02*** | (2006.01) |
| ***B24D 13/04*** | (2006.01) |

(52) U.S. Cl.

CPC .............. *B24B 23/02* (2013.01); *B24B 55/02* (2013.01); *B24B 57/02* (2013.01); *B24D 13/045* (2013.01); *B23B 2250/12* (2013.01)

(58) Field of Classification Search

CPC .............. A46B 11/001; A46B 11/0062; A46B 11/0065; B24D 13/147

USPC ........... 401/196, 25, 273, 263–264, 205–207

See application file for complete search history.

(56) References Cited

U.S. PATENT DOCUMENTS

| | | | | | |
|---|---|---|---|---|---|
| 1,885,997 | A * | 11/1932 | Durham | A47L 13/31 | 401/173 |
| 1,952,910 | A * | 3/1934 | Decker | B24B 57/00 | 15/98 |
| 2,103,493 | A * | 12/1937 | Robertson | A46B 11/0058 | 222/321.7 |
| 2,210,206 | A * | 8/1940 | Fisher | A45D 34/04 | 401/206 |
| 2,448,846 | A * | 9/1948 | Trochim | A61H 7/003 | 601/154 |
| 2,517,152 | A * | 8/1950 | Wilson | A46B 11/0013 | 401/27 |
| 2,556,112 | A * | 6/1951 | Schwartz | A47L 23/05 | 15/118 |
| 2,800,750 | A * | 7/1957 | Field | B24D 9/02 | 451/507 |
| 2,934,775 | A * | 5/1960 | Bergstrom | A47L 23/06 | 401/268 |
| 3,121,429 | A * | 2/1964 | Costa | A45D 34/04 | 401/206 |
| 3,129,452 | A * | 4/1964 | Schwartzman | B65D 47/42 | 264/249 |
| 3,256,551 | A * | 6/1966 | Schwartzman | B65D 47/44 | 401/206 |
| 3,583,383 | A * | 6/1971 | Ovshinsky | B23Q 11/1092 | 125/20 |
| 3,601,287 | A * | 8/1971 | Schwartzman | B22D 7/108 | 401/2 |
| 3,653,779 | A * | 4/1972 | Schwartzman | B65D 47/44 | 401/206 |
| 3,663,113 | A * | 5/1972 | Frain | B65D 47/42 | 401/206 |
| 3,731,854 | A * | 5/1973 | Casey | B65D 83/62 | 222/402.1 |
| 3,805,990 | A * | 4/1974 | Palaudarias | B65D 47/248 | 251/339 |
| 3,938,708 | A * | 2/1976 | Burger | B65D 83/62 | 239/323 |
| 3,951,310 | A * | 4/1976 | Steiman | B65D 83/7714 | 222/340 |
| 4,133,614 | A * | 1/1979 | Baginski | B65D 47/42 | 401/196 |
| 4,193,513 | A * | 3/1980 | Bull, Jr. | B65D 83/766 | 222/105 |
| 4,383,345 | A * | 5/1983 | Alexander | B24B 23/02 | 15/97.1 |
| 4,485,807 | A * | 12/1984 | Gueret | A61H 7/003 | 601/154 |
| 4,555,047 | A * | 11/1985 | Ackley | B23Q 3/1574 | 222/378 |
| 4,569,612 | A * | 2/1986 | Schwartzman | B05C 17/002 | 401/206 |
| 5,114,255 | A * | 5/1992 | Villarreal | A47L 13/26 | 401/206 |
| 5,309,594 | A * | 5/1994 | Thompson | B24B 23/02 | 15/97.1 |
| 5,781,955 | A * | 7/1998 | Hendricks | B24B 23/02 | 15/22.1 |
| 5,865,554 | A * | 2/1999 | Lin | A47L 23/05 | 401/206 |
| 5,890,849 | A * | 4/1999 | Cselle | B23Q 11/1046 | 408/1 R |
| 5,899,624 | A * | 5/1999 | Thompson | B43K 5/1845 | 401/196 |
| 5,967,887 | A * | 10/1999 | Synowski | B24D 13/12 | 451/544 |
| 6,210,064 | B1 * | 4/2001 | White | A46B 11/0062 | 401/279 |
| 6,789,702 | B2 * | 9/2004 | O'Connor | B65D 83/66 | 222/335 |
| 7,493,670 | B1 * | 2/2009 | Brogan | B24D 7/18 | 15/230.19 |
| 8,844,584 | B1 * | 9/2014 | Haley | B65B 3/26 | 141/3 |
| 9,457,491 | B2 * | 10/2016 | Miyanaga | B23B 51/06 | |
| 9,623,536 | B2 * | 4/2017 | Nüsslein | B24D 13/147 | |
| 10,702,118 | B2 * | 7/2020 | Mazzone | B24B 23/02 | |
| 10,898,930 | B1 * | 1/2021 | Garcia | A47L 13/16 | |
| 11,122,883 | B1 * | 9/2021 | Garcia | A46B 7/10 | |
| 2009/0014471 | A1 * | 1/2009 | Lin | B05B 11/026 | 222/96 |
| 2014/0073229 | A1 * | 3/2014 | Quinn | B24B 23/005 | 451/512 |

* cited by examiner

FLUID DISPENSING DEVICE WITH COUPLING TO POWER-DRIVEN TURNING TOOLS AND TURNING TOOL COMPRISING THE SAME

CROSS-REFERENCE TO RELATED APPLICATIONS

This application is a National Entry Application of PCT application No. PCT/ES2021/070115 filed on Feb. 18, 2021, which itself claims benefit of Spanish patent application Serial No. P202030140, filed on Feb. 18, 2020. All documents above are incorporated herein in their entirety by reference.

The present invention relates to a device that is coupled to motorised tools whose implement rotates, preferably tools of the portable or swivel type, supplying fluids either to the surface on which the consumable or implement acts, or to the consumable or implement itself so that the tool performs its function correctly.

BACKGROUND OF THE INVENTION

Power tools, whether electric, pneumatic, hydraulic or fuel-powered, which are used by coupling a consumable or implement in a housing, which rotates said consumable or implement to act on a surface or part of a body, are widely known. Such tools include, for example, surface treatment tools, such as polishing or similar tools, and milling or drilling tools, such as drilling machines.

The use of surface treatment products, such as fluids that improve the surface finish in their treatment, or lubricants or coolants for the milling or drilling of high-strength bodies, is widely known in the state of the art.

In order to optimise the application of fluids in processes in which motorised tools are used for surface treatment or for milling or drilling, which was originally done manually, interrupting the activity of the tool on the surface or body, application by means of a fluid dispensing system incorporated in the tool was introduced, as can be seen in U.S. Pat. No. 8,246,423.

This type of motorised tool required a major modification, describing mechanisms that made the tool a piece of equipment specifically designed for this purpose, with the consequent cost and limited applicability.

Also known are tools wherein its consumable or implement indivisibly integrates itself a quantity of fluid inside that is released during the operation of the tool. This is the case of surface polishing consumables in which the foam that is attached to the tool has an internal reservoir containing the fluid to be released during the application. These reservoirs supply the fluid by gravity and by pressure from their opening valve onto the surface to be treated.

These consumables or implements, which make it possible to avoid having to adapt the machine for this particular use, use more expensive consumables or implements than conventional ones, with the result that the consumables or implements, which would be considered as the consumables of the tool, increase the cost of the task to be performed, where the end of the working life of the consumable or implement means the end of the working life of the fluid dispensing system. This implies wasting the fluid contained in the fluid dispensing system every time the consumable breaks, wears out or needs to be replaced, with the consequent waste costs and environmental costs of waste management.

In view of this final price issue, to minimise the costs of this solution known configurations have been employed in the application in question, wherein the inner reservoir and those attached to the consumable or implement only have a dispensing/opening pressure valve.

In view of the foregoing, a device is needed to solve the above problems and to provide, in a conventional tool, the possibility of automatically supplying the necessary fluid to the surfaces/bodies being worked on, at an efficient cost and with versatility for use thereof on all types of bodies/surfaces.

DESCRIPTION OF THE INVENTION

The aim of the present invention is to provide a fluid dispensing device with coupling to motorised turning tools, as well as to provide a tool including same, which manages to solve the mentioned drawbacks while also presenting other advantages that will be described below.

For purpose of clarity, the term consumable or implement is used in this description to refer to the part or mechanism that is attached to a tool that provides a rotary motion to said consumable or implement to allow performing the desired function, e.g., a consumable or implement such as a drill bit. Also included as a consumable or implement is the consumable itself that can be used by the tool to perform the desired function, whether it is used in conjunction with a mechanism or part that is previously attached to the tool, or whether this consumable is attached directly to the tool. To illustrate this clarification, the head of a rotary sander with a sanding surface which is attached to a tool, and the consumable consisting of the sanding paper which is attached to a head with an interchangeable sanding paper coupling system, are both considered to be consumables or implements.

Also, by way of clarification, when motorised turning tools are referred to in this specification, they are to be understood as any tool where the turning movement of the fixture is non-manual, driven for example by pneumatic or hydraulic means, electric motors, or combustion engines, preferably based on drilling/drilling, milling or surface finishing tools.

In accordance with said aim, according to a first aspect, the present invention is based on a fluid dispensing device with coupling to motorised turning tools, which have a reservoir or cavity for storing the fluid to be dispensed, as well as a dispensing valve for same.

The invention is characterised in that the device comprises, at least:

- a coupling system for coupling the dispensing device to the type of tool to which it is coupled;
- a coupling system for coupling a consumable or implement to the dispensing device;
- a reservoir with a fluid pressure or vacuum dispensing system; and
- a dispensing valve for applying the fluid to the consumable or implement and/or a body to be treated with the tool.

It is also characterised in that the dispensing device is independent of the consumable or implement, the consumable or implement being coupled to the dispensing device such that the consumable or implement can be changed without decoupling the dispensing device from the tool.

These advantageous features make it possible to have a dispensing device that, without having to adapt the tool, and therefore being able to use an existing conventional tool, can be fitted with a fluid dispensing system prior to the consumable or implement that is used in the tool itself.

The invention is designed in such a way that the device is coupled by means of a conventional coupling system to the tool, so that it is the consumable or implement which, independently and interchangeably, is coupled to the device, performing the same action as if the consumable or implement were coupled to the tool, but with fluid dispensing either by pressure of the consumable or implement against the surface or body of application, or by user control.

The provision of a reservoir with the fluid under pressure or vacuum advantageously allows the device to be used in a mobile manner in inverted positions, which the gravity reservoir would not allow, and where a simple application of fluid by pressure from the consumable or implement on the surface on which it is applied would not be sufficient to dispense the fluid in these inverted or inclined positions.

The advantageous independence between device and consumable or implement allows the use of various consumables or implements that wear out or have to be changed during the process of using the tool, without having to remove or change the dispensing device, and conversely, allows the tool to be used without the dispensing device if desired.

According to a preferred embodiment of the invention, the dispensing device comprises a housing inside which is located the reservoir containing the fluid to be dispensed. This housing has a first coupling piece that allows the coupling of said device to the tool, which provides the rotation to the housing so as to perform the function of the consumable or implement that is coupled to it. On the other hand, the housing comprises a second coupling piece that allows the coupling of said consumable or implement to the dispensing device itself, transmitting the fluid from the reservoir to said consumable or implement through the dispensing valve, and transmitting the rotation to it, transmitted to the housing from the tool.

In this embodiment, a dispensing device is provided in the form of a housing that includes the means of direct connection to the tool and to the consumable or implement that is firmly attached thereto, thus transmitting the rotation of the tool, through its own rotation, to the consumable or implement that has been firmly attached thereto and from which it is independent. In the above, the housing itself contains the reservoir containing the fluid to be dispensed, as well as the dispensing valve, where this housing acts as an extension of the turning tool itself and a means of receiving the consumable or implement, allowing at its free end the coupling of the consumable or implement to provide same with rotation through its own rotation and provide it with the fluid to be dispensed.

With regard to the above-described embodiment, also preferably, the housing at the end opposite to the tool attachment, has a coupling piece formed by a textile or similar fixing layer, where the consumable or implement is fixed, bringing the dispensing valve in contact with the consumable or implement itself during the normal use for which it is intended.

This configuration allows, advantageously, the independent coupling of the consumable or implement to the housing that provides it with rotation and that dispenses the liquid, this coupling carried out by means of Velcro® type systems or the like, where the consumable or implement is formed by impregnation and surface treatment elements made from polyurethane material, wools or rubbers, such as the use of foams for the treatment and regeneration of varnishes, for example, allowing the change of these impregnation and surface treatment elements for others, without wasting the liquid to be dispensed as it is not necessary to change the rest of the dispensing device and, as mentioned above, coupling the assembly to a conventional type turning tool without the need to make any modification to it.

Alternatively, similar fixing systems that could be considered are those known for the above-mentioned consumable or implement, such as foams or other impregnating and surface treatment elements made of polyurethane material, wool or rubber, which may be fixed directly to the medium that provides the rotation.

According to a preferred embodiment of the invention, the coupling system of the dispensing device to the type of tool being coupled is conventional, being the same as that used by the consumable or implement for conventional coupling to the tool.

In this way, the present invention ensures that the device can be coupled to any of the tools that use that type of consumable or implement and that no modification to the tool is necessary, enabling to use a conventional tool. In the case of having a consumable or implement that is coupled to the tool and has consumables that are in turn coupled to the fixture, the device will be connected in the same way as the consumable or implement, but the connection for the consumable or implement is directly replaced by the method of coupling the consumable, which will be the element that will come into contact with the body or surface to be treated.

This is to be understood, for example, as will be seen in the preferred embodiments, as meaning that the dispensing device is configured such that if it is a drill, the dispensing device is attached to the chuck of the drilling tool by means of a standard shank in the same way as a drill bit would be. On the other hand, if it were a varnish treatment and regeneration tool, the device would be attached to the turning tool in the same way as, for example, a polishing head to a polishing tool and have a means of coupling the polishing foams. In this way, the conditions of the tool remain unchanged and existing tools can be used by providing them with this fluid dispensing system and independent consumable or implement coupling system.

Also, preferably, the coupling system of the consumable or implement to the dispensing device is conventional, being the same as the one used by the tool to couple the consumable or implement in a conventional manner.

In this way, the present invention also ensures that the device uses the same consumable or implement that would be attached to the tool without requiring the use of specially adapted consumable or implement.

In an optional embodiment of the invention, the reservoir is formed by the housing created by the walls of the device itself.

This would be the simplest embodiment, as the walls of the device form a reservoir-like housing on the inside, which has the sealing conditions to allow containing the fluid to be dispensed and the pressure/vacuum and valve elements. This makes it necessary to have means of filling said reservoir in order to reuse the device.

In a possible embodiment of the invention, in the case of having the fluid directly inside the walls of the housing, the housing has a system for refilling the fluid to be dispensed, which is sealed during the operation of the tool.

In another alternative embodiment of the invention, the reservoir is formed by a sub-reservoir housed inside the housing created by the walls of the device itself.

This allows the housing not to be filled directly as in the previous version, and instead it is the sub-reservoirs that contain the fluid and can be pre-filled.

In this regard, in another possible alternative embodiment of the invention, in this previous case of having sub-reservoirs containing the fluid to be dispensed inside the housing, the housing has a system for opening and accessing its interior space, in order to replace the sub-reservoir. This alternative allows the dispensing device to be reused, increasing its useful life.

Optionally, whether the reservoir is formed by the walls of the device or by sub-reservoirs inside the device, pressure is generated on the fluid in the reservoir by the displacement action of a piston, for continuous dispensing of the fluid.

Also optionally, the pressure generated to move the piston against the fluid in the reservoir is generated by spring pressure, gas pressure or a vacuum.

This configuration gives the device a constant pressure in any working position and ensures a complete emptying of the reservoir, thus eliminating liquid wastage. In the case of spring actuation, it achieves an actuation independent of the working temperature, while the use of gas or vacuum reduces the weight and vibrations of the spring pressure system.

With regard to the option of having an inner sub-reservoir, and optionally, although preferably in this alternative, the reservoir itself has an elastic property with pressure for its contraction and continuous dispensing of the fluid.

This alternative configuration allows, by means of a bellows or bag sub-reservoir, providing a system that ensures total sealing and temperature insulation of the liquid inside the reservoir due to the possible transmission of the external temperature through the wall of the reservoir.

In an optional embodiment of the invention, the dispensing valve may be of the spring-loaded push button valve type which opens by pressure against the push button/nozzle outlet and closes in the absence of pressure.

Alternatively, the dispensing valve may be of the electromagnet closing type, with a wireless push button that governs the closing/opening action of the electromagnet.

Alternatively, the dispensing valve can be equipped with a user-operated opening control system. In this way, it is possible to have a user-operated actuation, wireless or not, in which the opening of the valve is controlled and decided by the users at the time they deem necessary, without applying pressure during operation.

These features allow the fluid to be dispensed from the reservoir, or sub-reservoir, to the fixture and/or the body or surface to be treated with the tool.

Also, in accordance with the aim of the invention, and according to a second aspect, the present invention is also based on a motorised turning tool, to which is coupled at least one consumable or implement for treating or acting on a body or surface, which is characterised by the fact that the tool is fitted with a dispensing device as indicated in the aforementioned features.

This allows having a conventional tool that can be used in a mobile way in any position and without being modified to have a fluid dispensing system.

According to a preferred embodiment of this second aspect of the invention, the motorised turning tool is a polishing tool with a dispensing device which, in the present embodiment, is positioned as an extension of the tool in the form of a housing with a pressurised liquid reservoir, the consumable or implement being independently and interchangeably coupled to the dispensing device, and wherein the consumable or implement is a polishing sponge.

This embodiment makes it possible to have a polishing tool, understood as any tool for varnish treatment and/or regeneration, by means of a turning tool to which is coupled, in its conventional polishing head coupling system, a polishing liquid dispensing device such as the one described in the first aspect of the objectives of the invention. This gives the tool greater versatility of use and savings in components, since it can be used on surfaces where the effect of gravity on the liquid to be dispensed is not favourable, as well as making it possible to refill the housing containing the reservoir of the device with polishing liquid as many times as desired and only needing to change the polishing foam, generally understood as an impregnation and surface treatment element, made of polyurethane material, wool or rubber, which is attached to the housing, thus reducing waste and the cost of replacements.

BRIEF DESCRIPTION OF THE DRAWINGS

For the better understanding of the description made herein, a set of drawings has been provided wherein, schematically and solely by way of a non-limiting example, a practical case of an embodiment is portrayed.

DESCRIPTION OF A PREFERRED EMBODIMENT

Various embodiments of the dispensing device, as well as of the tool containing the dispensing device, of the present invention are described below with reference to the figures indicated above.

Figure 1:
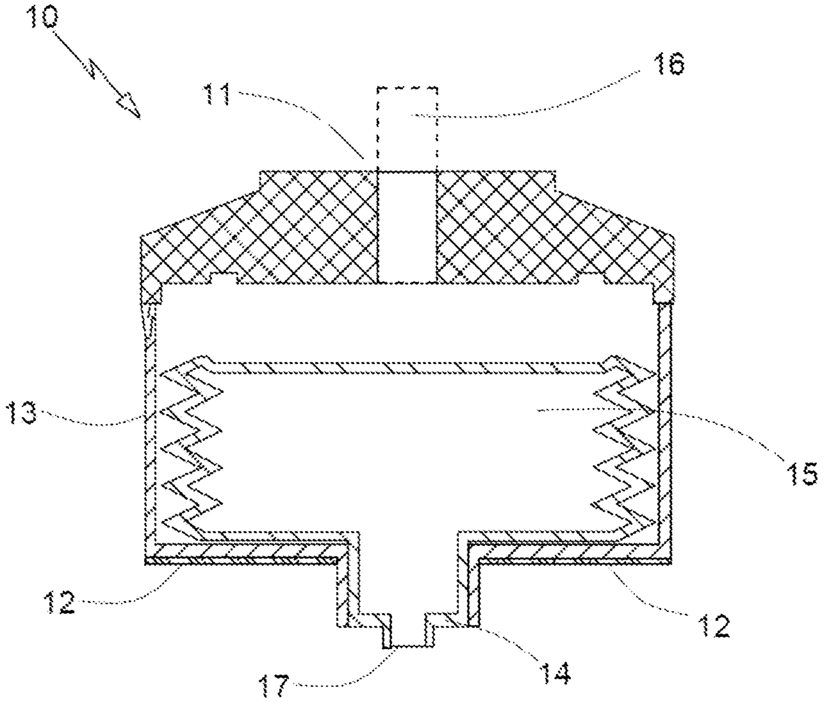
FIG. 1 is a sectional view of a dispensing device with a bellows sub-reservoir.
Figure 2:
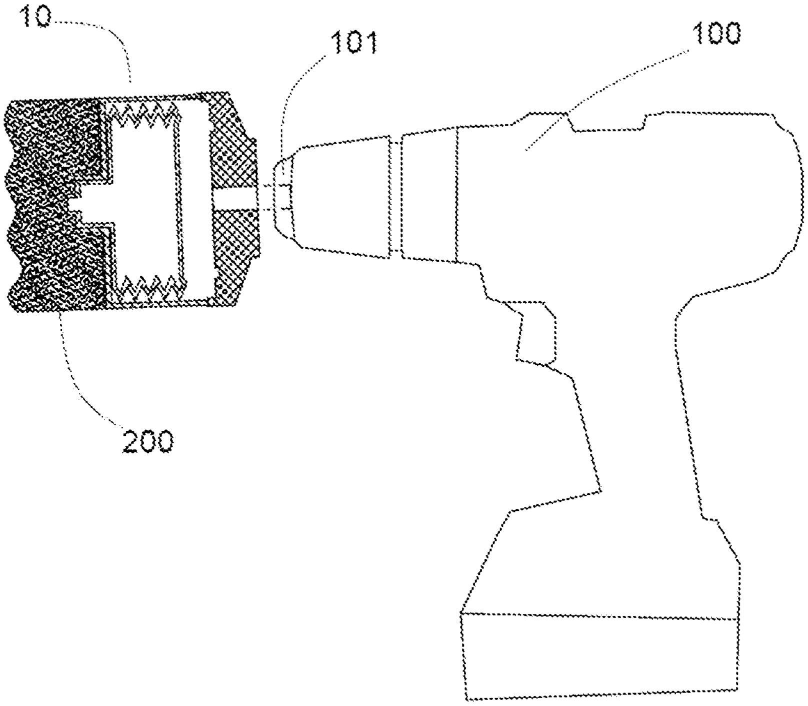
FIG. 2 is a partial sectional view of a dispensing device, as shown in FIG. 1, attached to the tool and with a polishing consumable or implement attached to the device.

According to the present embodiment, and as can be seen in FIGS. 1 and 2, the dispensing device (10) is applied to a polishing tool, such as a motorised turning tool (100). Polishing is to be understood broadly as any action related to the treatment and/or regeneration of varnishes applied to the products to be treated, which follows the same principle of actuation and use of the tool (100).

The dispensing device (10) consists of a housing (13) having a first coupling part (11) allowing the coupling of the dispensing device (10) to the tool (100) and a second coupling part (12) allowing the coupling of the consumable or implement (200) to the dispensing device (10) itself. The dispensing device (10) has a pressure valve (14), shown schematically, which opens when a certain pressure is exerted on the nozzle (17) of said valve (14).

Inside the housing (13) there is a bellows sub-reservoir (15) containing the fluid to be dispensed, in this case polishing fluid. The housing (13) can be opened and closed safely and tightly, so that this sub-reservoir (15) can be refilled or replaced when the fluid has run out. The closing/opening means are conventional, e.g., by means of a threaded lid, clip connection or any other press-fit system.

This bellows sub-reservoir (15) has a tendency to contract, so that the liquid inside it is subjected to constant pressure, meaning that the valve (14) always has liquid pressure to act in any position, even when there is no gravity to carry the liquid to the valve (14).

In the present embodiment, the coupling of the dispensing device (10) to the tool (100) is made by conventional means of coupling in this type of polishing plate tool, wherein a locking nipple or shank (16) is firmly attached to the head/chuck (101) of the tool (100).

In turn, the dispensing device (10), which in this embodiment acts as an extension of the tool (100) that independently contains the liquid reservoir to be dispensed, to which the polishing foams are interchangeably attached, has a coupling part (12) at its end opposite to the attachment to the tool (100), consisting of a "Velcro" type textile fastening layer for attaching the consumable or implement (200), in this embodiment being a consumable such as polishing foam.

Figure 3:
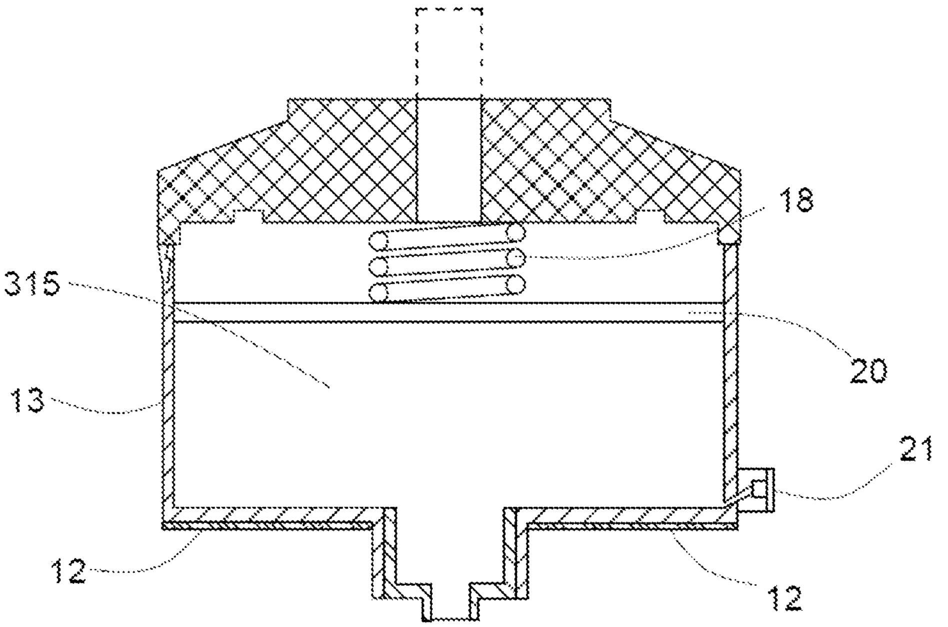
FIG. 3 is a sectional view of a dispensing device with a reservoir formed by the walls of the device itself and with a spring-loaded plunger as a pressure system.
Figure 4:
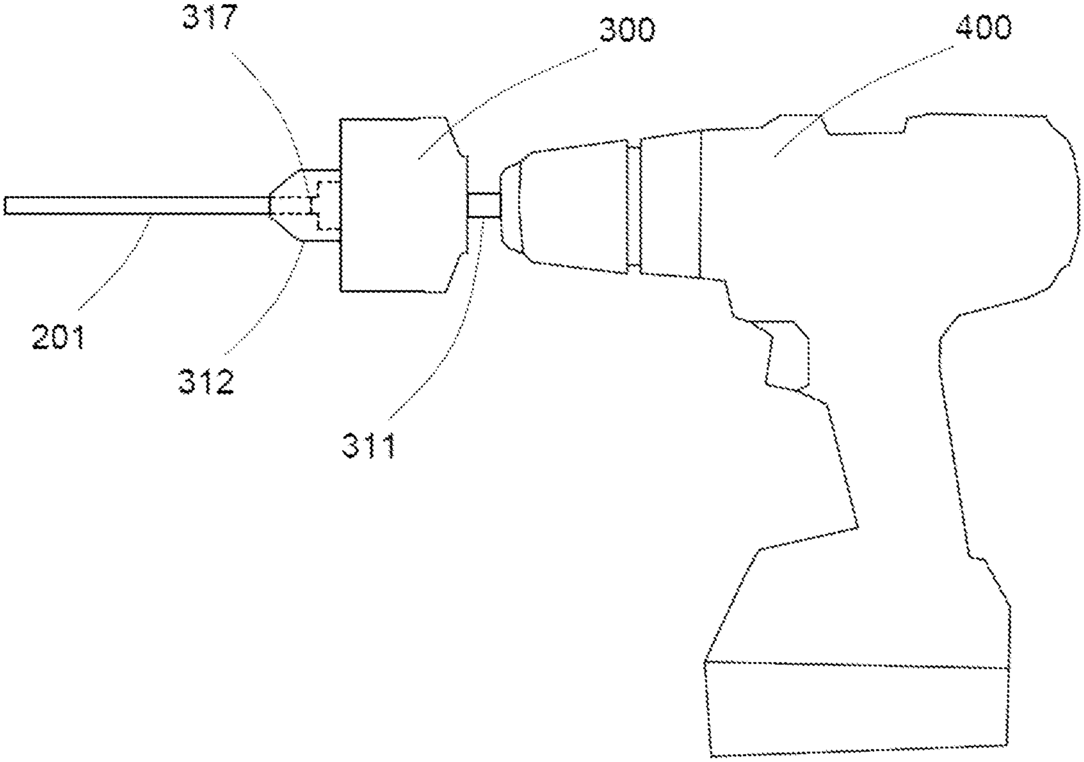
FIG. 4 is a perspective view of a dispensing device attached to the tool and with a drill bit attached to the device.

In its operation, as can be seen in FIGS. 3 and 4, the dispensing device (10) is secured to the tool (100) that provides it with the rotation to perform the function, and receives the coupling of its consumable or implement (200), the polishing sponge. The sub-reservoir (15), when subjected to a compression force, keeps the liquid inside it under pressure against the valve (14).

In alternative embodiments, as can be seen in FIG. 3, the walls of the housing (13) act as the reservoir (315) of the fluid having a plunger (20) displaced by an element, such as in this case a spring (18), which may be by the effect of a pressurised gas or vacuum, for example. In this case there is a refilling valve (21) that allows fluid to be introduced back into the housing (11) that forms the reservoir, which moves the plunger to a position that presses against the liquid.

Also, alternatively, the sub-reservoir, instead of a bellows, may be of another type, provided it has a compressive force to keep the liquid under pressure.

The consumable or implement (200), in this case a consumable in the form of a polishing sponge, when pressed against the surface to be treated, exerts pressure on the nozzle (17), which opens to dispense the liquid from inside the sub-reservoir (15) into the polishing sponge, as long as the operating pressure is maintained. This dispensing is carried out even in positions where gravity does not take the liquid to the sponge, as the pressure exerted by the sub-reservoir (15) itself allows the polishing liquid to exit through the nozzle (17) when the valve (14) opens.

Alternatively, the sponge may have an opening so that the dispensed liquid is deposited directly onto the surface to be treated, rather than being applied to the sponge. Pressure is applied directly from the surface to be treated onto the valve nozzle, as this opening in the sponge is coaxial with respect to the axis of rotation and the nozzle.

With respect to the valves, alternative embodiments may be user-operated valves, employing user-controlled valve-opening systems, e.g., of the electromagnet closing type, with a wireless push-button governing the closing/opening action of the electromagnet.

Alternatively, and by way of example of the use of drilling or milling type turning tools, the liquid dispensing device (300) is coupled to a drilling tool (400).

In this alternative embodiment, the metering device (300) is attached by means of a conventional connecting shank (311) to the drilling tool (400) and fixed in its conventional chuck.

In order to fix the drill bit (201), the dispensing device (300) has its own fixing chuck (312) for said drill bit (201). This fixing chuck (312) of the drill bit (201) exerts, directly or indirectly, pressure on the pressure opening nozzle of the metering device (300) so that when drilling and exerting pressure, this pressure is transferred to the nozzle (317) of the valve of the metering device (300) letting out, in this case, lubricating/cooling liquid to effectively carry out the drilling operation.

Although reference has been made to a specific embodiment of the invention, it will be obvious to a person skilled in the art that the fluid dispensing device with coupling to motorised turning tools, as well as the tool containing it, described above are susceptible to numerous variations and modifications, and that all the details mentioned can be substituted by other technically equivalent ones, without departing from the scope of protection defined by the accompanying claims.

The invention claimed is:

1. A fluid dispensing device for coupling to a motorised turning tool, the dispensing device comprising:

a housing (13) defining a rotation axis;

a first coupling system comprising a shank or locking nipple (16) fixed to the housing (13) and configured to be coupled to a chuck or head (101) of the motorised turning tool such that rotation of the motorised turning tool drives rotation of the housing (13) about said rotation axis;

a second coupling system provided at an end of the housing (13) opposite the first coupling system, the second coupling system comprising a hook-and-loop fixing layer configured to releasably couple a consumable to the housing (13) such that the consumable rotates with the housing (13);

a dispensing valve for applying a fluid to the consumable and/or a body to be treated with the motorised turning tool, the dispensing valve having a nozzle (17) arranged on said end of the housing (13) and configured to open upon axial pressure transmitted through the consumable; and a replaceable bellows sub-reservoir (15) housed inside an interior space created by walls of the housing (13), the bellows sub-reservoir (15) containing the fluid to be dispensed and being biased to contract to maintain the fluid under pressure for dispensing through the dispensing valve;

wherein the dispensing device is independent of the consumable, the consumable is replaceable without decoupling the dispensing device from the motorised turning tool.

2. The fluid dispensing device according to claim 1, wherein the housing has a system for opening and accessing its interior space, in order to replace the bellows sub-reservoir.

3. The fluid dispensing device according to claim 1, wherein the reservoir itself has an elastic property with pressure for its contraction and continuous dispensing of the fluid.

4. The fluid dispensing device according to claim 1, wherein the dispensing valve is a spring-loaded push button valve which opens by pressure against the push button and closes in the absence of pressure.

5. A motorized turning tool comprising the dispensing device of claim 1.

* * * * *